United States Patent [19]
McLean

[11] Patent Number: 5,672,034
[45] Date of Patent: Sep. 30, 1997

[54] SECURITY LOCK AND DEADBOLT LOCATOR

[76] Inventor: Melville J. McLean, 3411 Miracoma Ave., Anaheim, Calif. 92806

[21] Appl. No.: 493,437

[22] Filed: Jun. 22, 1995

[51] Int. Cl.$^6$ ............................................. B23B 45/14
[52] U.S. Cl. ............................... 408/79; 33/197; 33/562; 408/72 R; 408/115 R
[58] Field of Search .................. 408/72 R, 72 B, 408/115 R, 115 B, 79; 33/194, 197, 562, 563, 566; 144/27, 104, 144 R, 144.5 R

[56] References Cited

U.S. PATENT DOCUMENTS

| | | | |
|---|---|---|---|
| 2,832,154 | 4/1958 | Bauer | 144/27 |
| 3,212,366 | 10/1965 | Russell et al. | 408/115 R |
| 3,338,277 | 8/1967 | Tornoe et al. | 144/27 |
| 5,114,285 | 5/1992 | Brydon | 408/72 R |
| 5,116,170 | 5/1992 | Palmer et al. | 408/72 B |

Primary Examiner—Steven C. Bishop

[57] ABSTRACT

A carpenter's locator for use with a door boring jig, each of which have a straight side that can fit together, the locator thereby locating the boring jig the proper distance from the doorknob hole for boring a security lock or deadbolt lock hole is disclosed.

2 Claims, 1 Drawing Sheet

SECURITY LOCK AND DEADBOLT LOCATOR

FIELD OF THE INVENTION

This invention relates to carpentry and carpenter's tools. More specifically, this invention relates to finish carpenter's tools for installing doors and locks, such as deadbolts and security locks, in doors.

BACKGROUND OF THE INVENTION

Good workmanship requires that certain distances and locations be maintained during installation of the doorknob and the deadbolt, or by installing the doorknob and security lock, as may decided upon for a given door.

The centerline distance between the doorknob and the deadbolt should be held at 3⅝ inches. This is usually done by the carpenter using a tape measure and pencil to make the two centerline marks. This is a time-consuming operation and invites errors. If the tape is slipped or if it is misread, the door is ruined.

The centerline distance, 5½ inches, between the doorknob hole in the door and the security lock hole in the door is even more critical because both the doorknob and the security lock are made in a single block of metal. Thus, even the slightest error, for example of the type mentioned above, can result in a ruined door and, of course, considerable expense as well as lost time.

Some complex door hole boring jigs have been developed that are quite satisfactory for installing a single specific type of lockset. One such door hole boring jig is described in U.S. Pat. No. 3,338,277. Such door hole boring jigs are, however, of little value to most finish carpenters because of the variety of types of locksets extant today.

There are, however, some door hole boring jigs that are constructed and configured for boring and only one hole at a time. These are light, easily used and can be used for most lockset types. One such door hole boring jig is sold by McLean Incorporated and by several other companies. Functionally, such door hole boring jigs work generally in the same manner as the door hole boring jig described in the aforesaid U.S. patent except that only one hole is bored through the door at a time. The door hole boring jig is clamped to the door, extending over the edge of the door, and positioning the center of the hole borer to be set back the proper distance, e.g. 2⅜ inches or 2¾ inches, from the edge of the door. The door hole boring jig has stops, detents or keys to assure the proper setback of the hole from the edge. Once the door hole boring jig is in position and clamped, the hole is quickly and easily bored.

Door hole boring jigs of the type described solve one of the problems facing the finish carpenter—assuring proper setback of the hole from the edge of the door. However, the relative positioning of the holes for the doorknob and either the security lock or the deadbolt remains subject to error, as described, and involved time consuming measurements and rechecking to avoid spoiling a door.

A principle feature of the present invention is that it can be used in cooperation with the single hole door hole boring jig to assure that the proper vertical spacing between the doorknob and the security lock or the doorknob and the deadbolt, as the case may be with a given door.

SUMMARY OF THE INVENTION

The present invention is a locator for use with a door hole boring jig for door locks and comprises a plate constructed and configured to define a pair of opposed first and second parallel edges, an outer surface, and a generally planar inner surface, and split hub means. The split hub means is defined by a hub center and a plurality of radially spaced resiliently radially outwardly biased projections extending from points equidistant from the hub center from the inner surface of the plate. The plate is so constructed and configured as to position the first edge a distance Dsl from the hub center Hc which is position by the split hub to be aligned with the center DKc of the doorknob hole DKh into which the split hub is inserted when in use, to position the door hole boring jig such that the door lock center LKc will be the specified distance Ds, 5½ inches, from the doorknob center DKc when the invention is used to install security locks. When the invention is used to secure deadbolts in the door, the locator serves to position the second edge a distance Ddb from the hub center Hc, so that, when in use, the deadbolt lock center DBc, as located by the door hole boring jig, is the specified distance, 3⅝ inches, from the doorknob center DKc. The split hub being so constructed and configured as, when in use with the hub inserted in a previously bored doorknob hole DKh, to position the hub center at the center of said doorknob hole, the radially spaced projections thereof resiliently engaging the doorknob hole thereby positioning the hub center.

DESCRIPTION OF THE PREFERRED EMBODIMENT

The present invention is described in reference to a particular jig in respect to which specific dimensions are associated. Specific dimensions for hole placement are also mentioned. While these are currently common in the building trades, the principles of this invention are applicable to other jigs and spacings, etc.

In order to place the present invention in context, typical dimensions, etc. will be used, but without any intention of restricting the invention to any specific dimensions. The purpose of the invention is to provide a locator that can be manufactured in any dimension and used to locate holes in doors at any predetermined spacing accurately, quickly, inexpensively and reliably.

Figure 1:
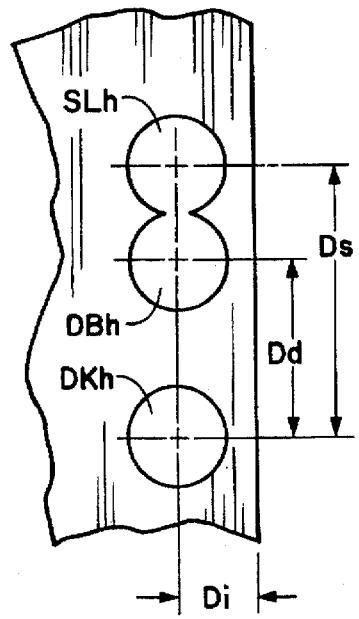
FIG. 1 is a cutaway elevational view of a portion of a door depicting the vertical and, generally, horizontal layout of the doorknob, security lock and deadbolt lock holes, and depicting for reference the distances between the centers of such holes.

Keeping in mind that specific dimensions are exemplary only, FIG. 1 depicts the relative positions of three holes in a door. Dimensions are from center to center of holes and from center of hole to edge of door, where inset from the edge is referred to. To begin with, the doorknob hole DKh is prebored. This is usually drilled a predetermined distance above the floor, with an inset Di typically of 2⅜ inches or 2¾ inches; however, greater insets (sometimes referred to as setbacks) are used and the distance of the doorknob above the floor differs in homes as compared with certain business entries, etc. The security lock hole SLh is a distance Ds, typically 5½ inches, from the doorknob hole DKh whereas the deadbolt hole Dbl is a distance Dd, usually 3⅝ inches from the DKh.

Figure 2A:
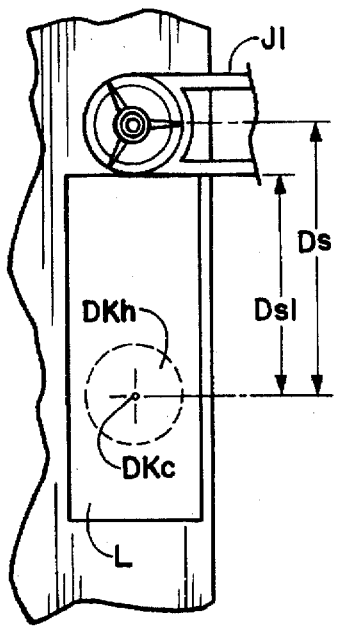
FIGS. 2A and 2B are elevational views of the portion of the door depicted in FIG. 1 but with the locator, L, of this invention and two of the jigs, J1 and J2, (which are identical jigs) exemplary of any of the general type of such jigs of the prior art with which the present invention is used to position for boring lock-receiving holes in doors.
Figure 2B:
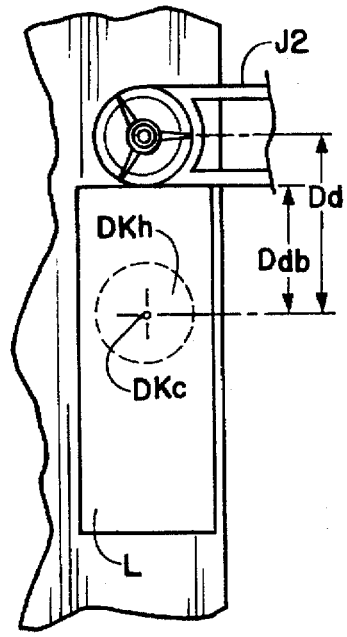

Referring now to FIGS. 2A and 2B which depict the locator L mounted in the door for use. As will be apparent from the description below, the locator L is held in to the door by the split hub arrangement depicted in FIG. 4 being inserted in the previously bored doorknob hole DKh. FIGS. 2A and 2B also depict two door hole boring jigs, J1 and J2, positioned at the respective edges, the upper and lower edges as depicted, of the locator L. Generally, of course, only one such jig will be used on a given door and it would be rare indeed that two jigs were actually attached as shown in FIGS. 2A and 2B. The illustrations in FIGS. 2A and 2B are, however, useful for study in connection with the depiction of FIG. 1 to understand the relationship of the locator L and the jigs.

It will now be apparent that the locator L is for use with a door hole boring jig for door locks. The locator L comprises a plate 10. The outer surface of the plate is typically flat with indicia as will be described but its nature and shape are not critical. The plate 10 has a generally planar inner surface, which is preferably but not necessarily surrounded by a flange for strength, rigidity and spacing the surface from the door when the locator L is in use. The plate 10 is constructed and configured to define a pair of opposed first and second parallel edges 12 and 14, and may define other edges 16 and 18, the nature of which is not critical. Edges 12 and 14 should, however, be straight and parallel to each other on plate.

Figure 3:
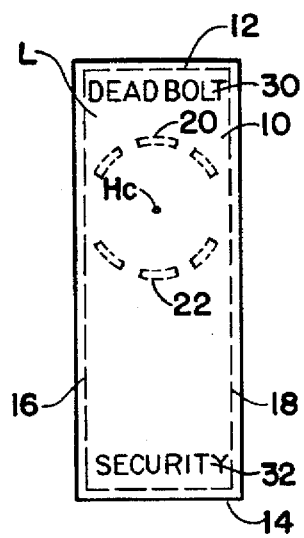
FIG. 3 is an outside plan view of the locator plate of this invention showing the indicia printed or embossed thereupon.
Figure 4:
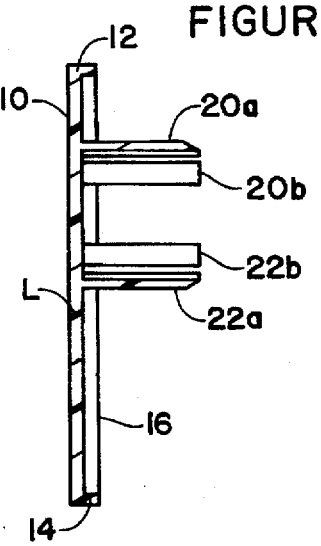
FIG. 4 is a side elevational view in cross-section locator of this invention taken along the vertical centerline of the locator as depicted in FIG. 3.
Figure 5:
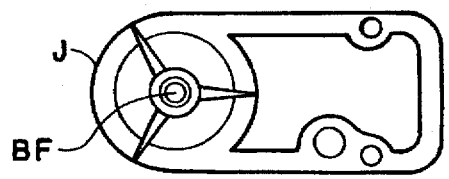
FIG. 5, marked PRIOR ART, depicts an exemplary prior art jig of the type to which reference is made.

Referring now specifically to FIGS. 3, 4 and 5, along with and in connection with FIGS. 1, 2A and 2B, the structure, function and use of the locator L will be described in greater detail.

The locator L also comprises a split hub means. The split hub means is defined by a hub center Hc, as indicated in FIG. 3, and comprises a plurality, six in the example depicted, of radially spaced resiliently radially outwardly biased projections 20 and 22 extending to points equidistant from the hub center from the inner surface of the plate. Portions of two projections 20a and 20b and projections 22a and 22b are depicted in Figure 4 showing the preferred spacing of the projections, namely, axially equidistant from the hub center Hc. The projections are either resilient and self-biased outwardly, as is the case in the preferred embodiment, or may be rigid or flexible and hinged or pivoted and biased outwardly by any desired means. The split hub, when inserted into the previously bored doorknob hole, with the projections forced slightly inwardly toward the center and biased to engage the hole, positions the hub center Hc at the doorknob center DKc, hence the hub center can be used as the reference point in all measurements from the doorknob center.

The plate is constructed and configured to position the first edge a distance Dsl from the hub center to position and, when in use with a door hole boring jig that has a linear side spaced from the center of a door lock hole boring fixture, BF, as shown in FIG. 5, to position the door hole boring jig such that the center of the door lock hole boring fixture LKc is the specified distance Ds, typically 5½ inches, from the doorknob center DKc, when the invention is used to install security locks.

Similarly, the plate is constructed and configured to position the second edge a distance Ddb from the hub center to position and, when in use with a door hole boring jig that has a linear side spaced from the center of a door lock hole boring fixture, BF, as shown in FIG. 5, to position the door hole boring jig such that the center of the door lock hole boring fixture LKc is the specified distance Db, typically 3⅝ inches, from the doorknob center DKc, when the invention is used to install deadbolt locks.

Indicia such indicated at 30 and 32, respectively, are desirably embossed, printed, silk-screened or otherwise formed adjacent the respective first and second edges to the locator L to indicate the usage of the respective edges. Additional indicia, such as instructions, dimensions, etc. may also be included on the locator L.

The locator L is preferably injection molded of any of the tough plastics, e.g. the polycarbonates, etc., but may be made of any strong dimensionally stable metal or other material. As mentioned, it is economical and convenient to provide a split hub with projections formed of resilient material; however, resiliency may be provided by springs, etc. if desired.

Again, the invention contemplates a locator for use with a boring jig each of which have a straight side that can fit together, the locator thereby locating the boring jig the proper distance from the doorknob hole, whatever that proper distance may be determined to be.

INDUSTRIAL APPLICATION

This invention is useful in the building construction industry.

What is claimed is:

1. A locator for use with a door hole boring jig for locating the position for drilling holes for security locks or deadbolts, or both, in doors a specified distance from a previously drilled doorknob hole in such doors, the locator comprising, in combination:

a plate constructed and configured to define a pair of opposed first and second parallel edges, an outer surface, and a generally planar inner surface; and split hub means defined by a hub center and comprising a plurality of radially spaced resiliently radially outwardly biased projections extending from points on the inner surface of the plate to points radially spaced and equidistant from the hub center;

the plate being so constructed and configured as to position the first edge a distance Dsl from the hub center to position, when in use, a door hole boring jig such that the door lock center LKc as defined by the door hole boring jig is a first predetermined distance from the doorknob center DKc as located by the split hub means on the locator, and to position the second edge a distance Ddb from the hub center to position, when in use, a door hole boring jig such that the deadbolt lock center DBc as defined by the door hole boring jig is a second predetermined distance from the the doorknob center DKc as located by the split hub means on the locator;

the split hub being so constructed and configured as, when in use with the hub inserted in a previously bored doorknob hole DKh, to position the hub center Hc at the center DKc of said doorknob hole DKh, the radially spaced projections thereof resiliently engaging the doorknob hole thereby positioning the hub center.

2. A finish carpenter's locator L for locating lock-receiving holes in doors, the locator comprising:

- a plate constructed and configured to define a pair of opposed first and second parallel straight edges, an outer surface, and a generally planar inner surface; and

- a circular split hub comprising a plurality of radially spaced resilient projections extending from points on the inner surface of the plate to points radially spaced and equidistant from a hub center located at the center of the circular split hub;

- the plate being so constructed and configured as to position the first straight edge a distance Dsl from the hub center Hc to position a door hole boring jig such that the door lock center LKc as defined by the door hole boring jig is a first predetermined distance from the doorknob center DKC as located by the split hub means on the locator, and to position the second edge a distance Ddb from the hub center to position a door hole boring jig such that the deadbolt lock center DBc as defined by the door hole boring jig is a second predetermined distance from the doorknob center DKc as located by the split hub means on the locator;

the split hub being so constructed and configured as, when in use with the hub inserted in a previously bored doorknob hole DKh, to position the hub center at the center of said doorknob hole.

* * * * *